United States Patent [19]

Lansbergen

[11] 4,189,802

[45] Feb. 26, 1980

[54] BATH SPONGE HAVING INCORPORATED THEREIN A CORE OF DETERGENT SUBSTANCES, AND METHOD AND APPARATUS FOR MANUFACTURING SAME

[76] Inventor: Simon G. Lansbergen, D. Liekensland 42, Keerbergen, Belgium

[21] Appl. No.: 927,968

[22] Filed: Jul. 26, 1978

[30] Foreign Application Priority Data

Aug. 3, 1977 [IT] Italy .............................. 21969/77[U]

[51] Int. Cl.² ...................... C11D 17/04; B29C 24/00; B32B 5/18

[52] U.S. Cl. .................................... 15/104.93; 252/90; 252/91; 252/93; 425/256; 425/259; 425/305.1

[58] Field of Search ........................ 425/256, 259, 260; 15/104. 93, 104.94; 252/90, 91, 93

[56] References Cited

U.S. PATENT DOCUMENTS

| | | | |
|---|---|---|---|
| 1,909,966 | 5/1933 | Jones | 252/93 X |
| 2,083,871 | 6/1937 | Serewicz | 252/93 X |
| 3,076,298 | 2/1963 | Tundermann | 252/92 X |
| 3,094,735 | 6/1963 | Hanlon | 15/104.93 |
| 3,447,181 | 6/1969 | Coker et al. | 252/91 X |
| 3,512,839 | 5/1970 | Jouffroy | 15/104.93 X |
| 3,619,843 | 11/1971 | Richter et al. | 252/91 X |

FOREIGN PATENT DOCUMENTS

| | | | |
|---|---|---|---|
| 1274855 | 9/1961 | France | 15/104.93 |
| 684066 | 3/1965 | Italy | 15/104.93 |
| 800723 | 9/1958 | United Kingdom | 15/104.93 |
| 939837 | 10/1963 | United Kingdom | 15/104.94 |

*Primary Examiner*—Philip Anderson

[57] ABSTRACT

An apparatus for manufacturing a bath sponge having incorporated therein a core of detergent substances is disclosed, comprising a plurality of containers 2 for receiving a sponge, apertured at their bottom; means for advancing the containers while swinging the containers in a plane substantially parallel to the advancement plane; a cutting station having a rod-like blade rotatable about its longitudinal axis, for insertion through the apertured container into the sponge; a station for feeding a detergent in paste-like condition, downstream of the cutting station and provided with a delivery nozzle for insertion through the apertured container into the sponge.

11 Claims, 5 Drawing Figures

BATH SPONGE HAVING INCORPORATED THEREIN A CORE OF DETERGENT SUBSTANCES, AND METHOD AND APPARATUS FOR MANUFACTURING SAME

BACKGROUND OF THE INVENTION

The present invention relates to an apparatus for manufacturing a bath sponge having incorporated therein a core of detergent substances, and also relates to the bath sponge thus obtained.

More specifically, the present invention relates to an apparatus by means of which it is possible to manufacture a bath sponge, which also forms the subject-matter of the present invention, having incorporated therein a solid core substantially comprised of detergent substances, suitable for producing, when brought in contact with warm water, a soap-like foam. This foam permits the usual operations of personal washing to be carried out, without having to resort to the use of either soap or foam-producing substances.

It is well-known that, at present, bath sponges are used as such, without any previous processing, and that in order to produce the foam, either soaps or detergent substances currently available on the market, are used.

As is known, the user finds it extremely uncomfortable to use such sponges because he has first to form the foam either with the soap or the foregoing detergent substances, and then he has to apply the foam thus formed to the sponge. This latter operation must be obviously repeated each time the foam applied to the sponge has been used up. This operation must be frequently repeated particularly when the user takes a shower, i.e. in those conditions when the water rate is high and the soap foam is used up rapidly.

Moreover, the above-mentioned drawback is further worsened by the fact that the user must use both his hands, thus limiting his freedom of movement.

The foregoing drawback can be partly overcome by resorting to known detergent substances high in foaming activity, which are available on the market. However, also these known detergents have to be applied to the sponge, generally on the occasion of each washing operation.

With a view to overcoming the foregoing drawbacks, efforts have been made to load the sponges with detergent substances and maintain said detergents inside the sponges, so that, at the moment of the sponge use, these substances could generate the required amount of foam.

Heretofore the foregoing problem has not been solved satisfactorily yet, because the detergent substances to be loaded in the sponges are normally liquid and, consequently, as soon as they have been brought into the sponge they present the tendency to escape through the sponge pores.

SUMMARY OF THE INVENTION

It has now been devised, and is the subject matter of the present invention, an apparatus by means of which it is possible to obtain a sponge of the above-mentioned type that, once finished, i.e. when the sponge has been loaded with the detergent substances, presents itself as a whole, single article, wherein the detergent is in the form of a solid core.

With the apparatus of the present invention it is not necessary to cut open the sponge which would otherwise be damaged irreparably.

Also the sponge manufactured by said apparatus forms the subject matter of the present invention.

The apparatus according to this invention, for manufacturing a bath sponge having incorporated therein a core of detergent substances, is characterized in that it comprises:

a plurality of containers, each container being suitable for receiving a sponge, said containers being substantially frusto-conical in cross-section and open at their larger base and provided at their smaller base with at least one hole;

means for advancing said containers, this means being adapted to perform a movement in one direction and in a second direction transverse to said one direction and provided with means for pivoting said containers, said pivoting means permitting swinging movements to take place in a plane substantially parallel to the advancement plane;

a cutting station, provided with a substantially rod-shaped blade, which rotates about its longitudinal axis, suitable for insertion into the sponge through said hole of the container;

a feeding station for feeding at least one detergent substance in paste-like condition, said feeding station being placed downstream of the cutting station and provided with a substantially rod-shaped delivery nozzle suitable for insertion into the sponge through the hole of the container.

BRIEF DESCRIPTION OF THE DRAWINGS

The characteristics of the apparatus which is the subject matter of the present invention, will become more apparent from the following detailed description of a non-limiting embodiment thereof with reference to the annexed schematic figures, wherein.

DETAILED DESCRIPTION OF THE PREFERRED EMBODIMENT

Figure 1:
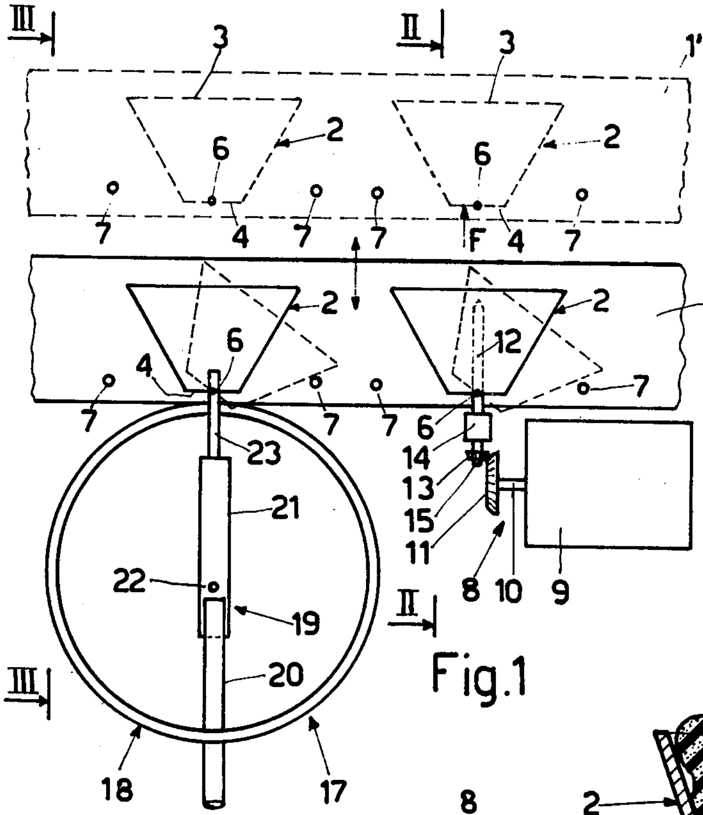
FIG. 1 is a plan view of the apparatus of the present invention.
Figure 2:
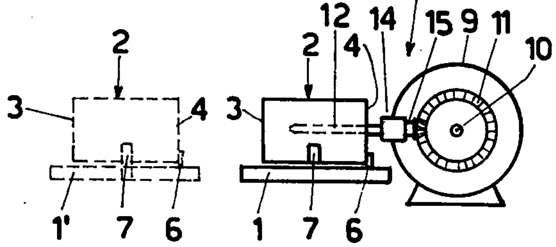
FIG. 2 is a cross-sectional view of the apparatus taken along line II—II of FIG. 1.
Figure 3:
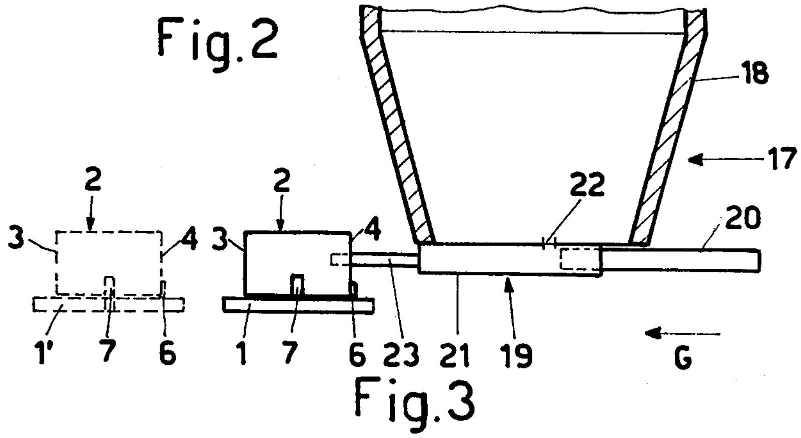
FIG. 3 is a cross-sectional view of the apparatus along line III—III of FIG. 1.

With specific reference to FIGS. 1, 2 and 3, the apparatus according to the present invention comprises a conveyor belt 1 (only a portion of which is shown in the figures) which is provided with known means (not shown) for controlling advancement thereof. The conveyor belt 1 is also provided with known means (not shown) suitable for bringing about a displacement thereof transversal to that of advancement between the position illustrated with the continuous line and the position 1' illustrated with the dotted line.

A plurality of containers 2, two of them only being shown in FIG. 1, are arranged on the conveyor belt 1. Each container is suitable for receiving a sponge.

Figure 4:
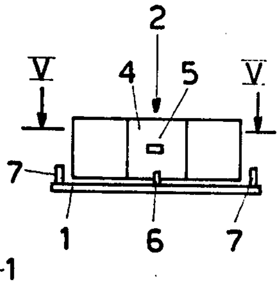
FIG. 4 is a front view of one of the containers along the direction of arrow F in FIG. 1.
Figure 5:
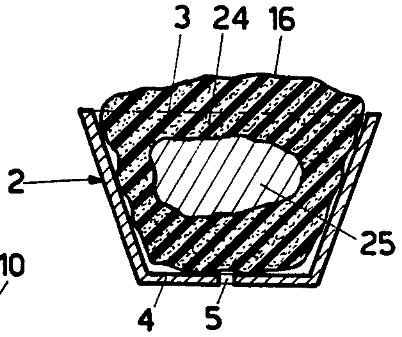
FIG. 5 is a cross-sectional view of one of the containers along line V—V of FIG. 4, showing schematically in detail the sponge having the detergent core incoporated therein, the sponge being accomodated in a container.

As particularly shown in FIGS. 1, 4 and 5 each container 2 comprises an essentially prismatically-shaped body, having a diminishing cross-section.

The containers 2 are open at their larger base 3 so as to permit the sponge to be inserted therein, and have a centrally positioned hole 5 in their smaller base, suitable for permitting all the operations for loading the sponge with the detergent substance to be carried out.

The containers 2 are arranged on the conveyor belt 1 in such a way that they are free to swing about an axis perpendicular to the conveyor belt and passing through the hole 5. To this end the conveyor belt 1 is provided with a plurality of stationary supporting pins 6 on each of which a container 2 is pivoted in correspondence with the median axis of its smaller base 4. Said connections can be achieved e.g. by means of a sleeve fixedly secured to the smaller base 4 of the container 2 freely rotatable about pin 6.

The swinging movements of the containers 2 are limited by stop means 7 provided on the conveyor belt 1 laterally of the containers 2. Also the stop means 7 consist of pins fixedly secured to the conveyor belt 1.

In FIG. 1, only one of the extreme swinging positions of the containers 2 is shown, the other one being symmetrical with respect to an axis at right angles to the advancement direction of the conveyor belt 1.

With reference now to FIGS. 1 and 2, the apparatus according to the present invention comprises a cutting station generally indicated with the reference numeral 8, which is arranged on the same side of the smaller base 4 of the containers 2. The cutting station 8 comprises a driving motor 9, for instance an electric motor, on the shaft 10 of which a face gear 11 is keyed for actuating a rotating blade.

The rotating blade, indicated with reference numeral 12, especially comprises a knife suitable for insertion into the sponge through the hole 5 of the container 2. The knife 12 is provided with protrusions 13 rotatably mounted within a fixably secured sleeve 14, the end 15 of which is toothed to mesh with the face gear 11.

When motor 9 is actuated, the face gear 11 and consequently the knife 12 are caused to rotate.

The rotation of the knife 12 and the swinging movement of the container 2 permit a recess or cavity 24 inside sponge 16 (see FIG. 5) to be obtained, whilst the sponge is compressed in the inner portion of the container 2, thus taking on substantially the shape of this latter. Particularly the sponge is compressed at a higher degree in correspondence with the smaller base 4, i.e. where the pivoting axis of the container 2 is. In such a way the recess 24 provided in the sponge 16 does not entail any tearing of the sponge which, once loaded with the detergent substance, is like any conventional sponge. Moreover, the swinging movement of the container 2 is kept within such limits that the tip of the knife 12 never reaches the proximity of the outer surface of the sponge 16. The zone in which the knife 12 has been introduced presents a narrow channel having the same dimensions as those of the sponge pores.

It is apparent that the pressure action exerted on the sponge 16 with a view to keeping it in the inner part of the container 2 as well as the swinging movement of this latter can be achieved in any way not shown, for instance by hand or by means of known devices, e.g. of a piston-like type, which are herein not specifically illustrated for simplicity's sake.

The operations for obtaining the inner recess of the sponge 16 are carried out in the following way.

The conveyor belt 1 is initially in the position 1' and is caused to advance until a container 2 having housed therein the sponge 16 is brought in front of the knife 12 of the cutting station 8. Subsequently, the conveyor belt 1' is brought into the position 1, i.e. the position in which the knife 12 is inserted into the container 2 through its hole 5. At this moment the motor 9 is actuated so that the knife 12 is caused to rotate and the swinging movement of the container 2 is thus brought about. Said swinging movement can be repeated sometimes in order to ensure that the recess 24 is formed completely.

With reference now to FIGS. 1 and 3 the apparatus of the present invention comprises a feeding station, generally indicated with the reference numeral 17, for feeding the detergent substances, said station being located downstream of the cutting station 8.

The feeding station 17, which must be suitable for introducing into the sponge 16 the detergent substance when this latter is in paste-like condition, comprises a substantially cylindrical, jacketed tank 18, provided with heating means (not shown) which permit the detergent substance in the tank 18 to be maintained constantly in paste-like condition.

In the lower portion of the tank 18 a delivery unit 19 is provided for dispensing prefixed amounts of detergent substance. Said unit 19, schematically illustrated in FIGS. 1 and 3, essentially comprises a piston 20, actuated in the sense of the arrow G by known means (not shown), slidably arranged within a cylinder 21 fixedly secured to the lower portion of the tank 18. The detergent substance enters cylinder 21 through a hole 22 provided in the upper portion of this latter.

On the forward end of cylinder 21, i.e. on the side thereof facing the smaller base 4 of container 2, a substantially rod-shaped delivery nozzle 23 is fixedly secured, which is in communication with the inner portion of cylinder 21.

The cross section of the delivery nozzle 23 is obviously slightly smaller than that of the hole 5 of the container 2, so that said nozzle 23 can be inserted into the container 2 as well as into the sponge 16 until it reaches the edge of the recess 24 previously made in the sponge 16. This is obtained in an identical manner as that of the insertion of the knife 12 into the sponge 16 because the conveyor belt 1, which finds itself firstly in the position 1', is caused to advance until it takes the container 2 in front of the feeding station 17. The conveyor belt is subsequently brought into its advanced position, until the nozzle 23 is inserted in the way hereinabove described and, at this moment, the piston 20 is actuated for introducing a predetermined amount of detergent substance into the recess 24.

During the whole loading step the container 2 is caused to swing in an identical manner as that carried out in the cutting station, so as to obtain an even distribution of the detergent substance in the inner of the recess 24 of the sponge 16.

As soon as the recess has been completely filled with the prefixed amount, the conveyor belt 1 is once again brought into its position 1', so as to disengage the delivery nozzle 23 from the sponge 16. This latter is extracted from container 2.

It is now only sufficient to wait for the solidification of the detergent substance to occur, at the end of which the substance takes on the consistency of a solid core 25 (see FIG. 5) completely surrounded by the sponge.

As can be noted particularly in FIG. 1 also the swinging movement of the container 2 about the delivery nozzle 23 does not bring about any tearing of the outer surface of the sponge for the same reason hereinabove discussed in connection with the cutting station.

The detergent substance does not come out of the sponge during the loading step because the inner recess provided in the sponge 16, which initially is substantially a true cut, permits the detergent substance to expand in the inner portion of the sponge without a noticeable pressure to be applied, which is, however, lower than that necessary to bring about detergent escape through its pores. Obviously, this is also brought about by the deformability of the sponge which offers a very limited resistance even to a small pressure.

As detergent substance a mixture of known-soapy detergent can be used, in which also foaming, solubility and consistency regulators can be optionally present, with the addition of sequestering agents and chelants for metals.

Optionally, in order to make more effective the action of the detergent substance, skin conditioners and perfumes can be added.

The detergent mixture suitable for use in the present invention must be solid at a temperature lower than about 40°-50° C., at higher temperatures the mixture taking on a viscous consistency. Consequently, in the feeding unit of the apparatus of the present invention, a temperature higher than 50° C. is maintained by means of a jacket in which steam or hot water is circulated.

The normal temperature of the rinsing water is not sufficient to bring the detergent substance back to its viscous state, so that the core of detergent substance remains in its solid state, even though it permits a gradual dissolution of said core with concurrent foam formation to take place.

The starting material, forming the detergent mixture, can be in any appropriate form, such as e.g. paste, flakes and powders.

It is apparent that changes and/or modification can be made to the embodiments shown of the apparatus of the present invention, without thereby departing from the spirit and scope of the invention as defined by the appended claims.

What I claim is:

1. A bath sponge provided with an internal cavity cut therein, at least one detergent substance in solid state filling said cavity, the material of said sponge surrounding said cavity being uninterrupted, and said detergent substance which when introduced into said cavity is in fluid state, being slightly diffused into the superficial porous layer of said sponge defining said cavity.

2. A method for manufacturing a bath sponge having incorporated therein a core of detergent substances comprising moving said sponge to a cutting station having a blade, inserting said blade into the sponge at said station while imparting to said sponge a swinging movement transverse to said blade whereby a cavity is cut in said sponge, thereafter moving said sponge to a feeding station having at least one detergent substance in paste-like condition and a nozzle, and inserting said nozzle into the cavity and filling same with said detergent substance.

3. An apparatus for manufacturing bath sponges having incorporated therein a core of detergent substances comprising a plurality of containers for individually receiving a sponge and each being substantially frusto-conical in cross-section with its larger base being open and its smaller base having at least one hole therein;

means for advancing said containers in one direction and in a second direction transverse to said one direction;

means for pivoting said containers in a plane substantially parallel to the plane of said one direction;

a cutting station located along the path of movement of said containers in said one direction, said cutting station having a rod-like blade for insertion into a sponge in a container at said station through said hole in the smaller base thereof, said blade in cooperation with the pivoting of the container producing a cavity within said sponge;

a feeding station for feeding at least one detergent substance in paste-like condition located along the path of movement of said containers downstream of said cutting station, said feeding station having a substantially rod-shaped delivery nozzle for insertion into a sponge in a container at said feeding station through said hole in the smaller base thereof, whereby to introduce a predetermined amount of detergent substance into said cavity.

4. An apparatus according to claim 3, wherein said rod-like blade is inserted into the hole in a container at said cutting station by actuation said means for advancing said containers in said second direction.

5. An apparatus according to claim 3, wherein said rod-shaped delivery nozzle is inserted into the hole in a container at said feeding station by actuating said means for advancing said containers in said second direction, said means for pivoting said containers being operable during the introduction of the detergent substance into said cavity to obtain even distribution therein.

6. An apparatus according to claim 3, wherein each container comprises a substantially prismatic body pivoted at its smaller base, and said means for advancing said containers comprises a conveyor belt for supporting said container.

7. An apparatus according to claim 6, wherein a pivoting point of the container to the conveyor belt is located underneath the hole.

8. An apparatus according to claim 3, wherein stop means is provided on the means for advancing said containers for limiting the pivoting amplitude of said containers.

9. An apparatus according to claim 6, wherein said blade comprises a knife arranged parallel to said conveyor belt and located with a stationary sleeve.

10. An apparatus according to claim 3, wherein said feeding station is provided with heating means for maintaining said detergent substance in paste-like condition.

11. An apparatus according to claim 10, wherein said heating means maintains the detergent substance at a temperature higher than 40° C.

* * * * *